Aug. 20, 1935.    F. PETERS    2,011,907
TUBE MAKING
Filed April 18, 1933    2 Sheets-Sheet 1
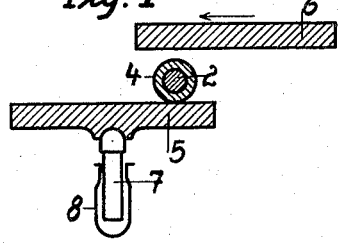 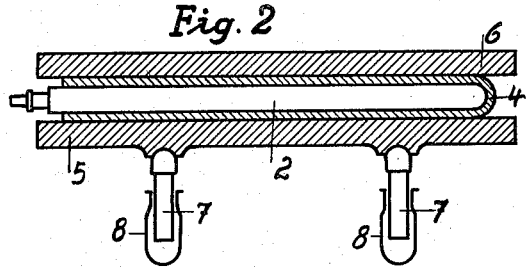
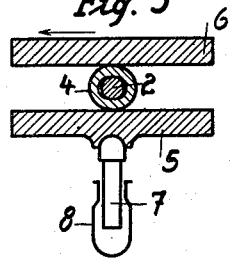 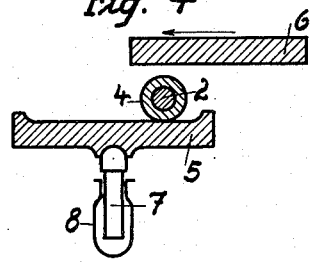 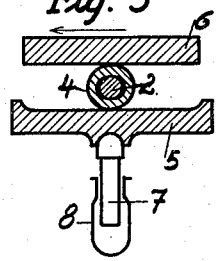
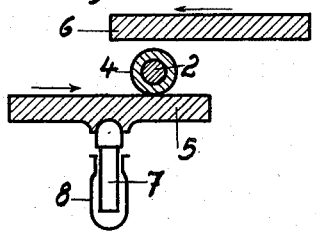 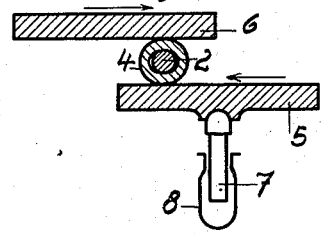
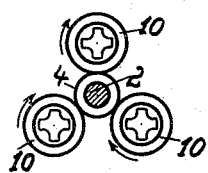 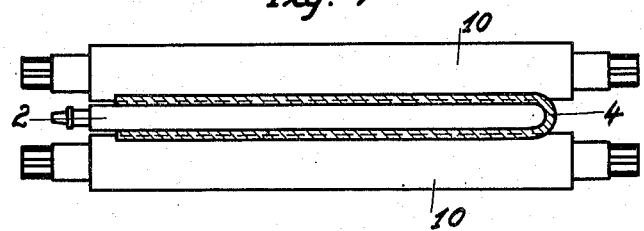
Inventor:
Fritz Peters
By C. F. Wenderoth
Atty Aug. 20, 1935.  F. PETERS  2,011,907
TUBE MAKING
Filed April 18, 1933  2 Sheets-Sheet 2
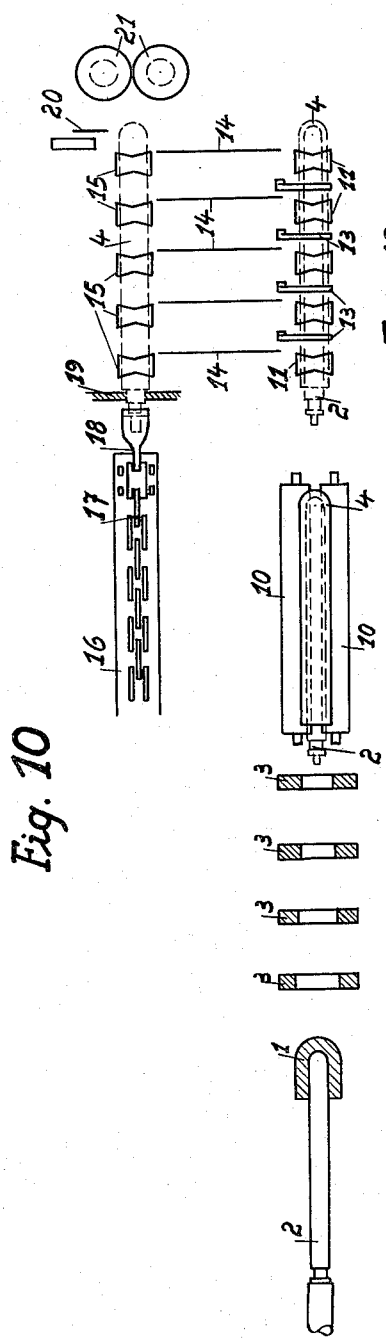
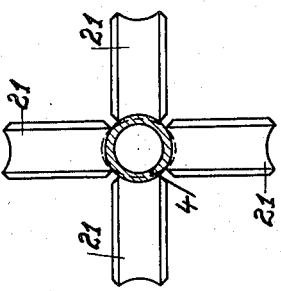
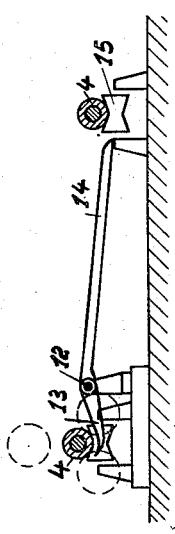

Patented Aug. 20, 1935

2,011,907

UNITED STATES PATENT OFFICE 2,011,907

TUBE MAKING

Fritz Peters, Dusseldorf, Germany

Application April 18, 1933, Serial No. 666,736
In Germany December 31, 1931

6 Claims. (Cl. 80—62)

The invention relates to a method and apparatus for producing seamless tubes, particularly thin walled tubes.

Hitherto such tubes have been made by first of all releasing the tubes, formed on the push bench, from the mandrel in a so-called releasing mill, and then if the wall thickness of the tube is to be further reduced effecting such reduction by a special rolling operation. The plant necessary for this manner of manufacture is very expensive; most important of all, the output is not satisfactory.

The present invention has for its object to provide a new method of producing tubes comprising associating with the known push bench operation, the releasing and when necessary the further rolling of the tube between rollers that rotate in the same direction or between relatively movable plates. By this means it is possible to release the tube completely from the mandrel in the minimum time and in the same working operation without any waste and also to reduce the thickness of the wall to the desired extent. The invention enables tubes to be made with thinner walls than is possible in other mills. The method has the further advantages of cheapness, large output and small power consumption.

The invention is illustrated by way of example in the accompanying drawings:

Figure 1 is a vertical sectional view of an apparatus for rolling a long hollow body on a mandrel bar which is guided vertically with respect to the longitudinal direction of the hollow body; the apparatus is shown in the rest position with a lower plate lowered.

Figure 2 shows the same apparatus in vertical section taken at 90° to Figure 1, the lower plate being in the raised operative position.

Figure 3 is a vertical section corresponding to Figure 1 with the parts disposed however in the operative position.

Figures 4 and 5 are sectional views corresponding to Figures 1 and 3 of a partly modified construction with the parts in the rest and operative positions respectively.

Figures 6 and 7 show the extreme positions of the apparatus illustrated in Figures 1 to 3.

Figures 8 and 9 are end and side elevations of a rolling apparatus.

Figure 10 is a diagrammatic view of the apparatus employed in the manufacture of the tubes.

Figure 11 is a side elevation of a detail associated with Figure 10.

Figure 12 is a cross section of a tube as it leaves the apparatus according to Figures 1 to 7 after very rigorous working.

Figure 13 is an end elevation of the rollers of a sizing mill housing, the work being shown in cross section.

The push bench process involves shaping a pre-heated square billet or ingot in a press to give it a thimble shape. This thimble 1, Figure 10, is applied to the forward end of a pushing mandrel or mandrel bar 2 and is pushed with the mandrel bar by means of a rack or hydraulic cylinder through a number of die-rings having gradually decreasing internal diameters so as to form a seamless hollow body 4 closed at the forward end and embracing throughout its length the mandrel bar. Up to this point the operations are known.

According to the present invention the hollow body 4 leaving the push bench is brought while still shrunk on the mandrel bar 2 between two plates 5 and 6 in a suitable manner, these plates supporting and covering the work piece 4 throughout its entire length. The lower of these plates is laterally immovable, but the upper plate is reciprocable horizontally and perpendicularly to the longitudinal axis of the hollow body. The pressure which the upper plate exerts on the work piece depends upon the weight of the plate and may be increased or adjusted by hydraulic, electric or other equivalent means. The parts of the work piece in contact with the plates are subjected by the weight or pressure of the upper plate to pressures which compress the material between the plates and mandrel bar and thus reduce the wall thickness of the work piece at the aforesaid parts. With sufficient reciprocation of the upper plate and sufficient pressure thereof on the work piece the wall thickness of the latter is considerably reduced and simultaneously the tube is increased in width with the result that the mandrel bar may be readily removed from the tube by manual or suitable mechanical means; further the repeated rotating of the work piece between the plates completely removes any grooves that may have been produced during forming of the hollow body on the push bench.

When the upper plate is guided horizontally in fixed guides the lower laterally immovable plate 5 may be adjustable in height, for example, by mounting it on plungers 7 which rise and fall in cylinders 8. The position of the plungers and consequently the position of the plate 5 is determined by appropriate admission of a pressure medium, such as water, into the cylinder. According to a modification the lower plate may be made reciprocable and the upper plate may be kept stationary; further the two plates may be moved in opposite directions to one another with upper and lower pressure as indicated in Figures 6 and 7. The reciprocation of the plates may be effected in any suitable manner, for example by crank or rack and pinion drive or by other known means; when the plates are reciprocated by the rack and pinion they may be directly provided with teeth to enable them to act as racks.

The lower plate or the lower support 9 may be formed with a depression as shown in Figures 4 and 5. This facilitates accurate raising of the tube-shaped work piece perpendicularly to the direction of movement of one or other of the plates.

The plates may also be replaced by rollers 10, which rotate in the same direction and one or more of which or if necessary all of which may be directly driven. The work piece 4 to be operated on is disposed with the mandrel bar 2 between the rollers 10 and parallel thereto. The new mill differs from a two high mill, whether it be a continuous mill, Pilger mill or stopper mill, in that the work piece is not placed transversely with respect to the roller axes but parallel thereto, the length of the rollers being at least equal to the length of the work piece to be operated on. If rollers are employed instead of plates the manner of operation and the guiding of the working parts are simplified.

In practice the plates or rollers would not be allowed to rest freely on the work piece, but at least their temporary operative position would be defined by stops, guides or the like, as is the case with ordinary mills where the upper plate is set and maintained in the set position by screw spindles. Such means is adapted in the new apparatus to enable the work pieces to be given exactly the same final dimensions as one another and also to ensure that the wall thickness of one and the same work piece is reduced to the same extent at all places and is thus completely uniform, this providing a considerable improvement over the old process.

The above described apparatus enables a novel method to be employed for manufacturing seamless tubes as illustrated in Figure 10.

A three high mill 10 is arranged adjacent the push bench represented by the die rings 3 which successively decrease in size internally. Beyond the mill 10 is disposed a receiving arrangement mainly comprising readily rotatable carrying rollers 11. Lifting out arms or levers 13 are rotatably supported on shafts 12 between the rollers. They may be raised and lowered by hand levers or by eccentrics or the like. In the lowered position they are not in contact with the work piece so that the latter may without hindrance pass from roller to roller 11 under the pushing action of the succeeding work piece. When the arms 13 are raised they lift the work piece from the rollers 11 and allow it to roll on to a suitable path constituted by bars 14 or the like and along said bars on to a carrying mechanism comprising rollers 15 which are initially stationary. In advance of the rollers 15 is disposed a known arrangement 16 having an endless chain 17 which by means of tongs 18 withdraws the mandrel bar from the work piece 4. In order to facilitate this the work piece bears against a stationary stripper 19 which may comprise a fork or a perforated sheet or the like since the mandrel bar is very loose or completely free within the work piece. This loose fit of the mandrel bar enables the chain 17 to be made much slenderer than hitherto.

A cutter or saw 20 is disposed at the end of the conveying mechanism 15 and after removal of the mandrel bar cuts off the thimble-shaped end of the work-piece thus making the tube open at both ends. A sizing mill 21 may be provided adjacent the conveyor 15 for use when the tube produced is not circular in cross section and is not made accurately to size. When plates are used as the rolling means the tubes receive with very vigorous rolling an oval cross section as shown in Figure 12, this deviating still further from circular cross section according as the work piece is widened by the plates. The sizing mill preferably comprises a series of housings each of which is provided with four rollers as shown in Figure 13 for embracing and imparting a completely cylindrical shape to the tubes.

The method of operation of the apparatus is as follows: A work piece operated on by the push bench is rolled to the desired thickness between the plates shown in Figures 1 to 7 or between the rollers shown in Figures 8 to 10. As a result of this the tube formed becomes loose on the mandrel bar. As soon as a second work piece leaves the push bench it pushes the work piece in front of it on to the rollers 11 whereupon the arms 13 are raised and the tube together with the mandrel bar therein rolls along the bars 14 on to the conveying device 15. Here the mandrel bar is withdrawn from the tube and the closed end of the latter is cut off by the saw 20. Owing to the fact that the rollers 15 may be rotated by any desired means in a predetermined direction they may be made to deliver the tube 4 to a sizing mill 21 which imparts a truly cylindrical cross section thereto and makes it of accurate size. The sequence of operations is then complete.

As above described the partly completed product from the push bench receives a considerable diminution in wall thickness by the immediately succeeding apparatus, this being accompanied incidentally with expansion of the work piece. The advantage of this arrangement in contradistinction to the polishing mill customarily used for this purpose consists in the fact that the work piece is operated on at the same time throughout its entire length, i. e. the thickness of the wall of the tube is reduced and the latter is expanded to a greater or lesser degree, whereas with a polishing mill in spite of its great consumption of power due to the considerable mass acceleration—a tube of average diameter passes through 600 to 700 revolutions in a polishing mill—only a very short portion of the length of the work-piece is operated on during each revolution and the reduction in wall thickness as well as the expansion is only about 3%. If the expansion obtained in a polishing mill is greater a twist becomes evident on the tube owing to the progressive rotating motion of the work-piece and such twist is hardly likely to be eliminated in the associated further working operations.

In a polishing mill during a single pass every part of the tube is only operated upon once by the rollers and therefore only a small reduction in the thickness of the wall is obtained, whereas with the new method and apparatus each part of the work-piece is operated upon many times throughout its whole length between the plates or rollers, this facilitating any desired reduction of the thickness of the wall of the tube. Apart from this advantageous effect the work is performed in a much shorter interval of time than is the case with a polishing mill as this requires a large number of revolutions of the rollers in order to pass the work-piece therethrough. By means of the arrangement according to the invention, on the other hand, the reduction in wall thickness and the degree of expansion as a multiple of the beforementioned percentage; they may amount to 50% and more.

This considerable increase means that the manufacturing output of the rack-operated push bench is considerably greater than hitherto. Whereas for economic reasons tubes of smaller diameters were made in one aggregate and tubes of greater diameters were made in another aggregate, it is now possible owing to the present invention to make larger diameter tubes advantageously of an aggregate normally used for smaller tubes as owing to the considerable expansion due to the present invention the use of a special aggregate for tubes of greater diameter is superfluous.

Instead of providing three rollers 10 uniformly positioned about the tube as indicated in Figures 8 and 9, only two diametrically opposed rollers need be employed; if desired, however, more than three rollers may be employed. In the former case it is necessary to provide means for guiding the tube to the necessary position between the rollers.

The sizing mill may comprise housings having less than four rollers.

What I claim is:—

1. A continuous method of producing seamless tubes comprising forming an elongated tube blank on a mandrel in a push bench, and directly at the conclusion of said process loosening the tube blank from the mandrel by rolling the tube simultaneously throughout its entire length between relatively movable members.

2. A continuous method of producing seamless tubes comprising forming an elongated tube blank on a mandrel in a push bench, and directly at the conclusion of said process loosening the tube blank from the mandrel by rolling the tube throughout its entire length between rollers that rotate in the same direction and have their axes parallel to that of the tube.

3. A continuous method of producing seamless tubes comprising forming an elongated tube blank on a mandrel in a push bench, and directly at the conclusion of said process loosening the tube blank from the mandrel by rolling the tube simultaneously throughout its entire length between relatively movable plates.

4. A continuous method of producing seamless tubes comprising forming an elongated tube blank on a mandrel in a push bench, and directly at the conclusion of said process loosening the tube blank from the mandrel and simultaneously effecting reduction in wall thickness of said tube blank by rolling the tube simultaneously throughout its entire length between relatively movable members.

5. A continuous method of producing seamless tubes comprising forming an elongated tube blank on a mandrel in a push bench, and directly at the conclusion of said process loosening the tube blank from the mandrel and simultaneously effecting reduction in wall thickness of said tube blank by rolling the tube simultaneously throughout its entire length between rollers that rotate in the same direction and have their axes parallel to that of the tube.

6. A continuous method of producing seamless tubes comprising forming an elongated tube blank on a mandrel in a push bench, and directly at the conclusion of said process loosening the tube blank from the mandrel and simultaneously effecting reduction in wall thickness of said tube blank by rolling the tube simultaneously throughout its entire length between relatively movable plates.

FRITZ PETERS.